No. 680,211. Patented Aug. 6, 1901.
W. J. WISWALL.
DISK CULTIVATOR.
(Application filed Oct. 23, 1899. Renewed May 9, 1901.)
(No Model.)
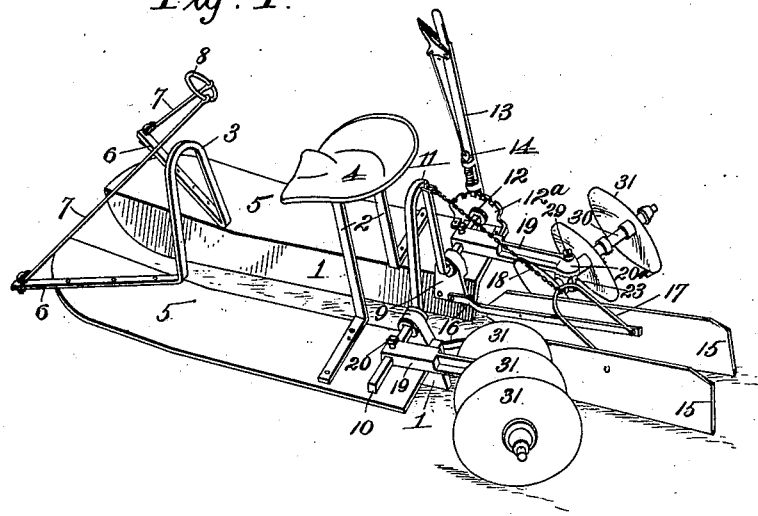
Fig. 1.
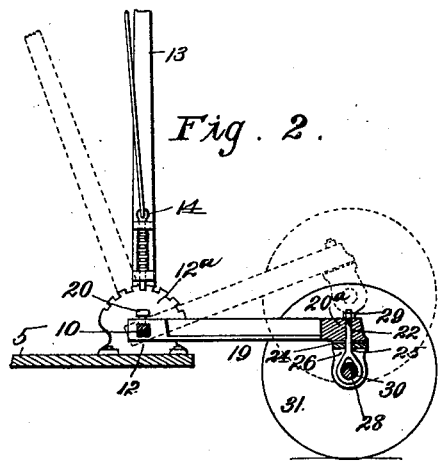
Fig. 2.
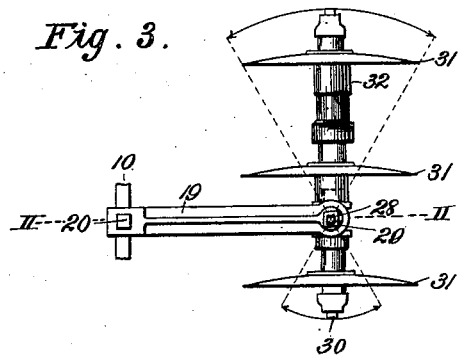
Fig. 3.
Fig. 4.
Fig. 5.
WITNESSES:
H. C. Rodgers.
A. Thorpe.
INVENTOR
Wm. J. Wiswall
BY
Fischer & Thorpe
ATTORNEYS.
THE NORRIS PETERS CO., PHOTO-LITHO., WASHINGTON, D. C.

UNITED STATES PATENT OFFICE.

WILLIAM J. WISWALL, OF KANSAS CITY, MISSOURI, ASSIGNOR TO THE OHIO CULTIVATOR COMPANY, OF BELLEVUE, OHIO.

DISK CULTIVATOR.

SPECIFICATION forming part of Letters Patent No. 680,211, dated August 6, 1901.

Application filed October 23, 1899. Renewed May 9, 1901. Serial No. 59,527. (No model.)

*To all whom it may concern:*

Be it known that I, WILLIAM J. WISWALL, a citizen of the United States, residing at Kansas City, in the county of Jackson and State of Missouri, have invented a new and useful Disk Cultivator, of which the following is a specification.

My invention relates to disk cultivators; and it consists in certain novel and peculiar features of construction and combinations of parts, as hereinafter described and claimed.

The object of the invention is to provide a disk cultivator of that class embodying disk gangs adapted to be arranged at different angles to the line of draft and elevated to an inoperative position and wherein said disk gangs may be adjusted nearer together or farther apart which is of simple, compact, strong, and durable construction.

In order that the invention may be fully understood, reference is to be had to the accompanying drawings, in which—

Figure 1 represents a perspective view of a disk cultivator embodying my invention. Fig. 2 is a sectional view taken on the line II II of Fig. 3 and showing also the sector and controlling-lever. Fig. 3 is a plan view of one of the disk gangs and of the adjustable arms carrying and swiveled to the same. Fig. 4 is a vertical section, enlarged, of the connection whereby said arms and disk gangs are swiveled together. Fig. 5 is a perspective view showing the parts of said connection detached.

In the said drawings, A sled is constructed as follows: 11 designate runners which slant upwardly and outwardly, but have their lower edges parallel with each other and their upper edges parallel with each other. 2 designates an inverted U-shaped arch connecting said runners near their rear ends, and 3 a similar arch connecting the runners near their front ends, the arch 2 being surmounted by the seat 4. The lower ends of the arches are bolted or otherwise secured to horizontal wings or clod-crushers 5, projecting horizontally outward from the upper edges of the runners, and pivotally connected to the front ends of the arms 6 of arch 3 are the converging draft-rods 7, pivotally united by a ring 8 for engagement by a hook on the doubletree, (not shown,) to which the draft-animals are hitched.

9 designate bearing-plates which are secured rigidly to the rear end of the runners and project above the same, and 10 a shaft which is journaled in said bearing-plates and is provided between them with an upwardly-projecting portion 11, the horizontal portion of the shaft projecting beyond the bearing-plates being rectangular in cross-section by preference. Upon one end of said shaft is secured a collar 12, journaled in a toothed sector $12^a$, secured to the adjacent wing 5, and keyed or otherwise rigidly secured to the shaft outward of said sector is a lever 13, within convenient reach of the driver upon seat 4 and provided with the usual spring-actuated dog 14 for engagement with the sector.

In order to protect young plants from being crushed by rolling clods or by an excess of earth turned in by the disks hereinafter described, a shield or fender is attached as a trailer to the sled and consists of a pair of runners 15, provided with forwardly-projecting arms 16, pivoted at their front end to the bearing-plates 9 and pivotally connected at their rear ends by the arched link 17 and a chain 18 to the rear end of the axle-arch 11. By this arrangement it is obvious that the forward or backward movement of lever 13 through the medium of the arched shaft 10 raises or lowers the shield or fender, the same being secured at the proper point by the engagement of the spring-actuated dog 14 with the proper notch of the sector $12^a$, as will be readily understood.

19 designates a pair of parallel arms fitting non-rotatably but slidingly on the horizontal portions of the shaft 10 and secured at the desired point by the set-screws 20. The rear ends of said arms terminate in circular heads $20^a$, provided with radial teeth 21 at their under sides and vertical holes 2, the holes extending completely through and centrally of said heads.

23 designates a swivel-casting of circular form in plan view and provided at its upper side with radial teeth 24, corresponding to teeth 21 and with a central vertical hole 25. The swivel-casting is also provided with depending ears 26, having alined circular holes 27. This casting of course is in duplicate, one being secured to each bar 19, the connection being established as follows: 28 designates eyebolts which are fitted up through holes 25 of the swivel-castings and the registering holes 22 of the circular-headed bars 19 and are engaged at their projecting upper ends by means of nuts 29, which, being screwed down upon said eyebolts, clamp the swivel-castings 23 firmly up against the circular heads 20$^a$ of bars 19, the mutual engagement of the teeth 21 and 24 preventing any rotary movement of the swivel-castings after thus being once secured. Each casting at one side is provided with an outwardly-projecting collar or thimble 26$^a$ of the same internal diameter as the openings 27 and at opposite sides with an outwardly-projecting collar or thimble 26$^b$ of a greater diameter.

30 designates a shaft extending through alined openings 27 of each swivel-casting, and 31 a series of cultivator-disks journaled upon said shafts, said disks being held reliably at the proper distance apart by means of collars 32, one end of one collar being overlapped by the adjacent collar at one end and overlapping the corresponding collar at the other end, one collar of each shaft overlapping the collar or thimble 26$^a$ of the corresponding swivel-casting and the adjacent end of another collar of each shaft being overlapped by the collar or thimble 26$^b$ of the corresponding swivel-casting. By this arrangement it will be seen that sand or other foreign matter is prevented from entering and grinding out the bearing.

The operation of the lever 13, hereinbefore described with relation to the shield or fender 15, obviously also raises or lowers the disk-gangs, as the arms 19 fit non-rotatably upon the shaft 10, and it will be seen also that the in-and-out adjustment of arms 19 upon the shaft move the disk gangs nearer together or farther apart.

To adjust the shafts at different angles to each other and to the line of draft, it is only necessary to loosen up the bolts 29, so as to swing the swivel-castings 23 to the desired position upon the eyebolts 28 and then clamp them in their new position by means of nuts 29, as will be readily understood.

From the above description it will be apparent that I have produced a disk cultivator which embodies the features of advantage enumerated as desirable in the statement of invention and which possesses also the advantages of simplicity, strength, durability, and cheapness of construction.

Having thus described the invention, what I claim as new, and desire to secure by Letters Patent, is—

A disk cultivator, comprising a sled, a shaft carried thereby, a lever mounted on said shaft, an arm projecting non-rotatably from said shaft and provided with a hole 22, and teeth extending radially of said hole at the underside of the arm, a casting provided with a registering hole and corresponding teeth, and provided also with depending perforated ears, a shaft extending through the perforations of said ears and carrying cultivator-disks, an eyebolt having its eye encircling said shaft between said ears, and its stem extending up through said registering holes, and a clamping-nut engaging the upper end of said eyebolt, substantially as described.

In testimony whereof I affix my signature in the presence of two witnesses.

WILLIAM J. WISWALL.

Witnesses:
H. C. RODGERS,
G. Y. THORPE.